Feb. 21, 1956  J. D. LOYD  2,735,501
TRACTOR REAR AXLE HOUSING ASSEMBLY SUPPORT
Filed Oct. 8, 1954
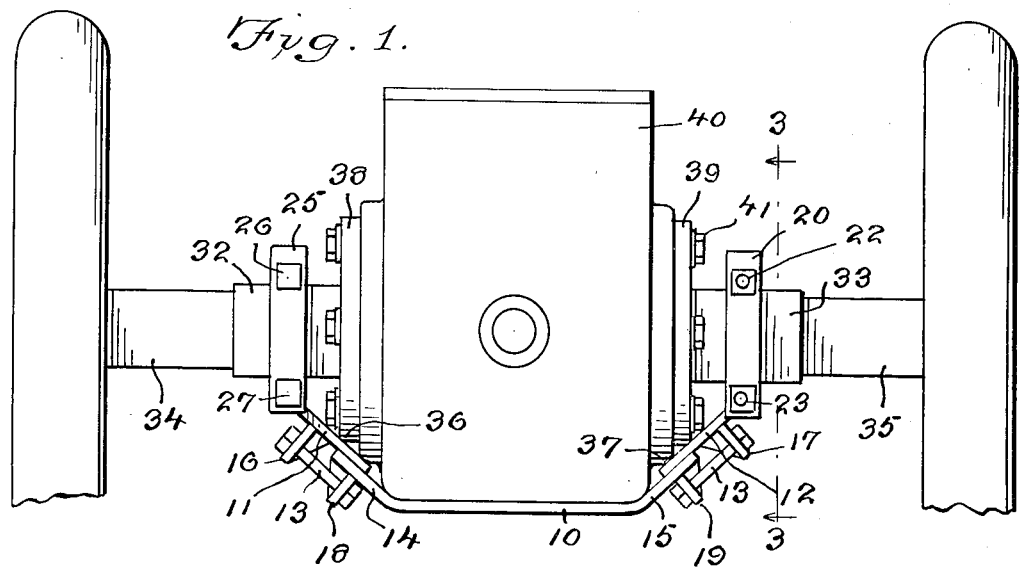
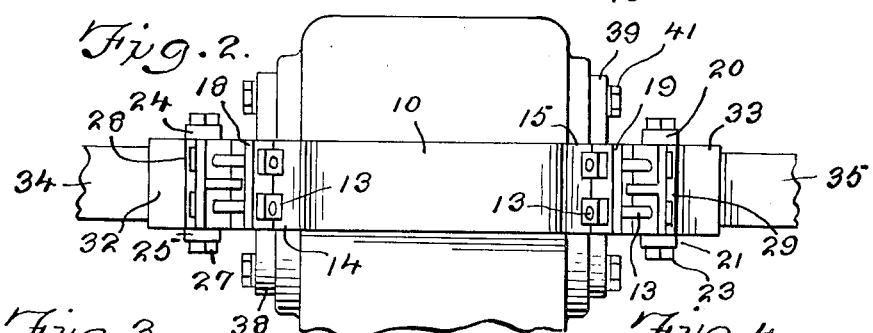
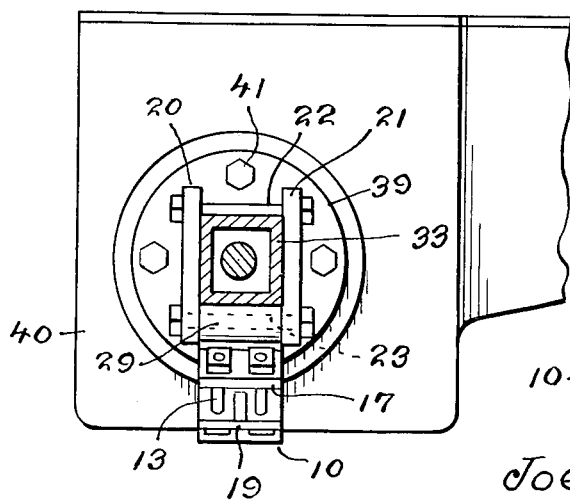
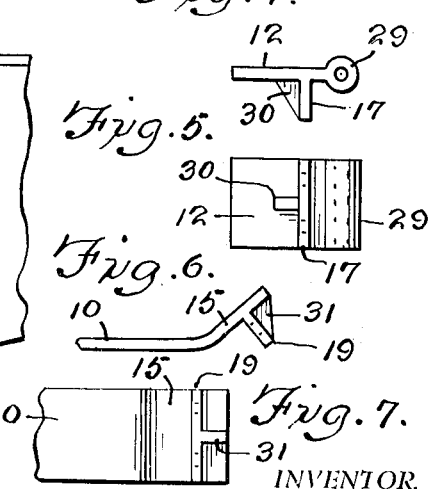
INVENTOR.
Joe D. Loyd
BY Victor J. Evans & Co.
ATTORNEYS

United States Patent Office 2,735,501
Patented Feb. 21, 1956

2,735,501

TRACTOR REAR AXLE HOUSING ASSEMBLY SUPPORT

Joe D. Loyd, Hosston, La., assignor, by decree of distribution, of one-half to Myrtle H. Loyd and one-half to Clyde C. Loyd.

Application October 8, 1954, Serial No. 461,150

4 Claims. (Cl. 180—75)

This invention relates to reinforcing or supporting devices particularly adapted to be installed on rear axle housings of tractors and the like.

The purpose of this invention is to provide a support that is adapted to be installed on a rear axle housing assembly which retains tension in connections between the rear axle housing sections and the differential housing whereby it is substantially impossible for such connections to work loose.

In using tractors for heavy duty such as with cotton pickers where heavy loads are taken by the rear axle assembly, the cap screws and studs work loose, particularly in traveling over rough ground causing the bolt holes to wear rapidly with the result that oil is drained from the differential and the gears and bearings wear rapidly.

The object of this invention is, therefore, to provide an auxiliary attachment adapted to be installed on a rear axle assembly of a tractor or the like with which the connections of the rear axle housing to the differential housing are retained in tension continuously whereby the possibility of bolts and the like in the connections working loose is obviated.

Other features and advantages of the invention will appear from the following description, taken in connection with the drawing, wherein:

Figure 1 is a rear elevational view showing the rear axle housing assembly of a tractor with parts of the tractor housing omitted and illustrating the installation of the rear axle housing assembly support with parts of the wheels of the tractor broken away.

Figure 2 is a view looking upwardly toward the under surface of the rear axle and differential housing assembly showing the tension applying bracket mounted thereon.

Figure 3 is a cross section taken on line 3—3 of Figure 1 illustrating one of the clamps for anchoring the pressure or anchor plates to the sections of the rear axle housing, parts of the tractor housing being broken away.

Figure 4 is a side elevational view of one of the pressure or anchor plates with other parts omitted.

Figure 5 is a view looking upwardly toward the under side of the plate shown in Figure 4.

Figure 6 is a side elevational view showing one of the upwardly extended ends of the base plate with the opposite end broken away.

Figure 7 is a view looking upwardly toward the under surface of the end of the base plate shown in Figure 6.

Referring now to the drawing, wherein like reference characters denote corresponding parts, the tractor rear axle housing support of this invention includes a base plate 10, anchor plates 11 and 12, bolts 13 adjustably connecting the anchor plates to upwardly extended ends 14 and 15 of the base plate, the bolts extending through openings in lugs 16 and 17 on the anchor plates and 18 and 19 on the upwardly extended ends 14 and 15, respectively, of the base plate 10, and clamps having side bars 20 and 21 secured with bolts 22 and 23 on one side and similar bars 24 and 25 secured with bolts 26 and 27, on the opposite side.

The extended ends of the anchor plates 11 and 12 are provided with tubes 28 and 29 that are positioned between the side bars of the clamps and, as illustrated in Figure 3, the lower bolts 23 and 27 extend through the tubes.

As illustrated in Figure 4, the lugs 16 and 17 are reinforced with gusset plates 30 and, as illustrated in Figure 6, the lugs 18 and 19 are reinforced with similar gusset plates 31.

With the parts formed and assembled as shown and described, the clamps are positioned with the side bars secured against the sides of sections 32 and 33 of rear axle housing members 34 and 35 and, as illustrated in Figure 1, the pressure or anchor plates 11 and 12 are positioned to bear against lower corners at points 36 and 37 of flanges 38 and 39, respectively, by which the rear axle housing sections are secured to the differential housing 40 with bolts 41. By adjusting the bolts 13, pressure is maintained against the flanges 38 and 39 whereby the connecting parts are retained in tension and the possibility of the bolts 41 working loose is obviated.

Although the ends of the base plate and also the anchor or pressure plates are illustrated as being straight, it will be understood that these plates may be formed to correspond with differential and rear axle housings of different patterns and the clamps formed with the side bars and bolts may also be shaped to correspond with rear axle housings of different designs.

The bolts 13 make it possible to take up wear in the parts as the tractor is used whereby tension is maintained continuously in the bolts connecting the rear axle housing sections to the differential housing.

It will be understood that modifications, within the scope of the appended claims, may be made in the design and arrangement of the parts without departing from the spirit of the invention.

What is claimed is:

1. A tractor rear axle housing assembly support for a rear axle assembly having a central or differential housing part and two side axle housing parts connected thereto, said side axle housing parts having connecting flanges thereon and the underside of the central or differential housing extends below the axle housing parts, comprising a base plate positioned below the central part of the housing and means clamping ends of the base plate to side parts of the rear axle housing with the clamping means bearing against the connecting flanges of the rear axle housing parts whereby said connecting flanges are retained in tension.

2. A tractor rear axle housing assembly support for a rear axle assembly having a central or differential housing part and two side axle housing parts connected thereto, said side axle housing parts having connecting flanges thereon and the underside of the central or differential housing extends below the axle housing parts, comprising a plate extended below the central portion of the rear axle housing, means connecting ends of the plate to side parts of the rear axle housing with the connecting means positioned to bear against the connecting flanges of the housing parts for maintaining said connecting flanges in tension, and said connecting means permitting adjustment of the connections between the ends of the plate and rear axle housing parts.

3. In a tension applying support for a rear axle housing assembly of a tractor having a central or differential housing part and two side axle housing parts connected thereto, said side axle housing parts having connecting flanges thereon and the underside of the central or differential housing extends below the axle housing parts, the combination which comprises a base plate having upwardly inclined ends with lugs extended from lower surfaces thereof, anchor plates also having lugs extended from lower surfaces thereof and having tubes on extended ends thereof that are opposite to the ends that are slidably mounted on the upwardly extended ends of said base, bolts extended through the lugs of the anchor plates and upwardly inclined ends of the base plate, and side bars positioned on the vertical sides of each side section with upper and lower bolts extended therethrough adapted to be positioned on said axle housing parts with the lower bolts thereof extended through said tubes on the extended ends of the anchor plates.

4. In a tension applying support for a rear axle housing assembly of a tractor having a central or differential housing part and two side axle housing parts connected thereto, said side axle housing parts having connecting flanges thereon and the underside of the central or differential housing extends below the axle housing parts, the combination which comprises a base plate having upwardly inclined ends with lugs extended from lower surfaces thereof, anchor plates also having lugs extended from lower surfaces thereof and having tubes on extended ends thereof that are opposite to the ends that are slidably mounted on the upwardly extended ends of said base, bolts extended through the lugs of the anchor plates and upwardly inclined ends of the base plate, and side bars positioned on the vertical sides of each side section with upper and lower bolts extended therethrough adapted to be positioned on said axle housing parts with the lower bolts thereof extended through said tubes on the extended ends of the anchor plates, said support being adapted to be positioned with the base plate against the lower surface of the differential housing of said axle assembly and with the anchor plates bearing against flanges of the side axle housing parts and connecting said parts to the differential housing.

References Cited in the file of this patent

UNITED STATES PATENTS

| | | |
|---|---|---|
| 1,120,933 | Groves | Dec. 15, 1914 |
| 2,095,344 | Nelson | Oct. 12, 1937 |